Patented Jan. 26, 1937

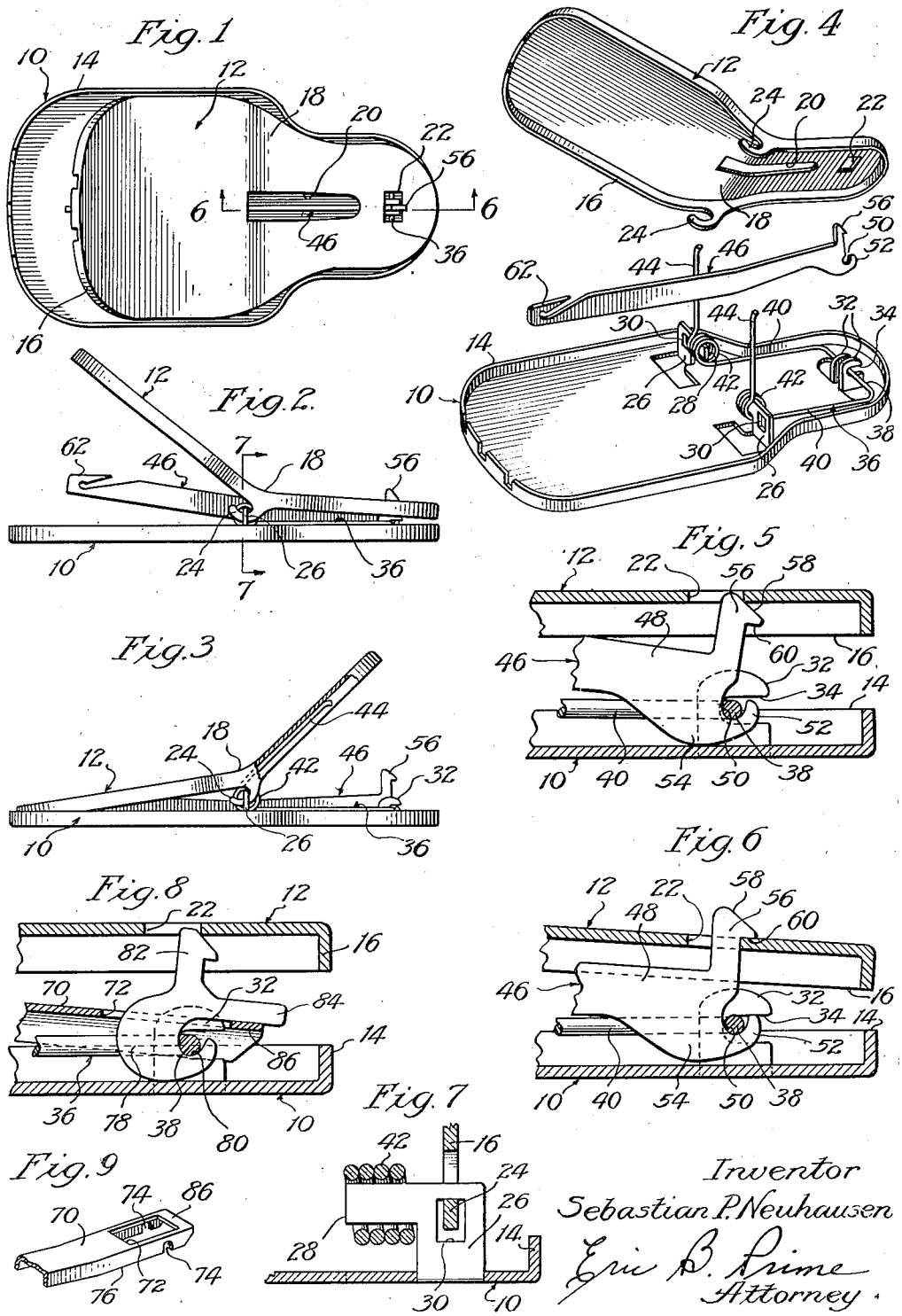

2,068,865

UNITED STATES PATENT OFFICE 2,068,865

ANIMAL TRAP

Sebastian P. Neuhausen, Lombard, Ill., assignor to Stampit Corporation, Lombard, Ill., a corporation of Illinois Application September 30, 1933, Serial No. 691,578
Renewed January 29, 1936

6 Claims. (Cl. 43—83)

My invention relates to improvements in animal traps.

An object of my invention is to provide an animal trap of the type adapted for catching mice having an improved construction whereby the trap, when set, may be easily sprung by a mouse.

A further object of my invention is to provide an animal trap having an improved construction whereby the trap may be quickly and easily set.

A further object of my invention is to provide an animal trap which is simple in construction, has few parts, and may be quickly and easily assembled.

In the accompanying drawing:

Figure 1 is a top plan view of a trap embodying my invention;

Figure 2 is a side elevation of the trap in its set position;

Figure 3 is a side elevation of the trap in its sprung position, a portion being shown in section;

Figure 4 is a perspective view of the several elements comprising the trap, the elements being positioned for illustrating the manner in which they may be assembled;

Figure 5 is an enlarged detail sectional view of a portion of the trap showing the positions of certain elements while the trap is being set;

Figure 6 is an enlarged detail sectional view taken along the line 6—6 of Figure 1, and similar to Figure 5, showing the positions of certain elements when the trap is set; and Figure 7 is an enlarged detail sectional view of a portion of the trap taken along the line 7—7 of Figure 2.

Figures 8 and 9 show an alternative structure for operatively connecting the trip arm with the base member and top member.

In the embodiment selected to illustrate my invention, I provide a base member or plate 10 and a top member or plate 12. The base member 10 and the top member 12 are elongated as shown in Figure 4, and are provided with peripheral flange portions 14 and 16, respectively. The base member and the top member are preferably formed from a sheet metal and the flange portions are formed integral therewith.

The top member 12 is bent at an intermediate portion 18, as shown in Figures 1 to 4, inclusive and is provided with a longitudinally extending slotted opening 20, and an opening 22 therein.

The peripheral flange portion 16 is provided with a pair of projecting portions or hook portions 24 which are positioned on opposite sides of the top member as shown in Figure 4.

The base member 10 is provided with a pair of upwardly extending portions 26 which in turn are provided with inwardly extending portions 28. The upwardly extending portions 26 and their inwardly extending portions 28 are preferably formed from the base member 10, as shown in Figures 4 and 7.

The upwardly extending portions 26 extend at substantially right angles to the base member 10 and are provided with openings 30 therein for receiving the hook portions 24 whereby the top member 12 may be swingably connected with the base member 10.

The base member 10 is also provided with a pair of spaced apart upwardly extending lug portions 32 integral therewith as shown in Figure 4. The lug portions 32 are provided with aligned slotted openings 34 therein as shown in Figures 4, 5 and 6.

A spring member 36 is operatively associated with the base member 10 and the top member 12 and comprises an intermediate portion 38, side portions 40, helical portions 42 and extending spring portions 44. The intermediate portion 38 extends through the slotted openings 34 of the lug portions 32, and the helical portions 42 are disposed on the inwardly extending portions 28. The extending spring portions 44 engage the lower side of the top member 12 and tend to retain the top member in its closed or sprung position shown in Figure 3. The diameter of the wire of the spring 36 is less than the width of the slotted openings 34 in lug portions 32 in order that the intermediate portion 38 of the spring may move transversely or vertically within the slotted openings 34.

A trip arm or trigger arm 46 is positioned between the top member 12 and the bottom member 10 and has an end portion 48 thereof extending between the lug portions 32. The end portion 48 of the trip arm 46 is provided with a recess 50 for receiving the intermediate portion 38 of the spring 36 and is also provided with an extending portion 52 for retaining the spring in the recess.

The end portion 48 of the trip arm 46 is further provided with a cam or fulcrum portion 54 adapted for engagement with the base member 10 whereby the pressure of the intermediate portion 38 of the spring 36 downwardly on the end portion 48 of the trip arm will tend to lift the opposite end portion of the trip arm.

A catch portion 56 is connected with the end portion 48 of the trip arm 46 and is movable through the opening 22 in the top member 12 for engagement with the top member as shown in Figure 6 whereby the top member may be retained in the set position shown in Figure 2.

The catch portion 56 is provided with an inclined top edge 58 and a shoulder 60, as shown in Figures 5 and 6, the shoulder being the means for connecting the catch portion with the top member 12.

As clearly shown in Figures 2 and 4, the trip arm 46 may be provided with a hook end portion 62 whereby bait may be disposed on or secured to the trip arm.

In assembling the trap the spring 36 is first connected with the base member 10 in the manner shown in Figure 4. The trip arm 46 is then positioned so that the end portion 48 extends between the lug portions 32 and the intermediate portion of the spring 36 is disposed in the recess 50. The top member 12 is then pressed downwardly against the extending spring portions 44 until the hook portions 24 connected with the top member 12 enter the openings 30 in the upwardly extending portions 26 connected with the base member 10 for swingably connecting the top member with the base member. The top and bottom members will then be disposed in their closed positions shown in Figure 3.

To set the trap the top member 12 is moved from the position shown in Figure 3 to the position shown in Figures 2 and 6. As the top member moves to the position shown in Figures 2 and 6, the intermediate portion 38 of the spring 36 presses downwardly on the end portion 48 of the trip arm 46 for moving the fulcrum portion 54 of the trip arm 46 into engagement with the base member 10 and lifting the end of the trip arm having the hook portion 62. As the top member is manually moved further toward set position, it contacts the inclined edge 58 of the catch 56 as shown in Figure 5, and swings the bait lever 46 counter-clockwise as viewed in said figure. This movement of the lever 46 takes place against the downward thrust exerted by the spring portion 38, and when the top has been moved downwardly until the catch 56 extends through the opening 22, the downward thrust of the spring portion 38 swings the bait lever 46 clockwise into the position shown in Figures 2 and 6.

It will be noted that when the top member 12 is disposed in its set position, the tendency of the extending spring portions 44 to move the top member 12 back to its closed position in Figure 3 will exert a lifting force on the catch portion 56 of the trip lever 46 thereby tending to lift the fulcrum portion 54 of the trip arm 46 against the downward pressure of the intermediate portion 38 of the spring 36 and out of engagement with the base member 10 for relieving the friction between the fulcrum portion of the trip arm and the base member.

Thus it will be seen that only the engagement of the shoulder of the catch portion with the top member prevents the trip arm from pivoting on the intermediate portion of the spring 36.

To spring the trap the mouse or animal for which the trap may be adapted needs only to move the trip arm sufficiently to overcome the friction between the catch portion and the top member for moving the catch portion out of engagement with the top member whereupon the top member will be sprung downwardly for catching and retaining the animal between the top and bottom members.

In Figures 8 and 9 I have shown an alternative structure for operatively connecting the trip arm with the base member and top member.

In this form I provide a trip arm 70 which is channel shaped as shown in Figure 9. The trip arm is provided with an opening 72 therein through which the lug portions 32 extend. The trip arm is also provided with aligned recesses 74 in sides 76 thereof for receiving the intermediate portion 38 of the spring 36 therein for pivotally mounting the trip arm on the spring. A cam element 78 is positioned between the lug portions 32 and extends through the opening 72. The cam element 78 is provided with a recess 80 for receiving the intermediate portion 38 of the spring 36, and is also provided with a catch portion 82 corresponding to the catch portion 56.

The cam element 78 is further provided with a projection 84 which engages a transverse or cross portion 86 of the trip arm. The cam element is positioned for engagement with the base 10 as shown in Figure 8.

When the top member 12 is moved to its set position as has been heretofore described, the spring presses down on the cam element causing the cam element to pivot on the intermediate portion 38 of the spring 36.

As the cam element turns, the projection 84 presses down on the transverse portion 86 of the trip arm 70 causing the opposite end of the trip arm to be lifted. When the top member 12 is disposed in its set position, the catch portion 82 extends within the opening 22 in the top member and engages the top member for retaining the top member in the set position.

When the trip arm 70 is actuated by the mouse or animal to be caught, the projection 84 of the cam element 78 is moved upwardly by the transverse portion 86 of the trip arm thereby releasing the catch portion 82 from the top member 12 whereupon the top member 12 will spring to the position shown in Figure 3 for catching the animal between the top and base members.

Without further elaboration, it is believed that the foregoing fully explains the invention so that the same may be readily adapted for use under various conditions.

I claim:

1. A trap comprising a base member provided with a pair of spaced apart upwardly extending portions having openings therein, a top member mounted on the base member and provided with projecting elements extending within the openings in the upwardly extending portions for swingably connecting the top member with the base member, a spring associated with the base member and the top member and provided with loop portions for connecting the spring with the upwardly extending portions, said spring being adapted for yieldingly retaining the top member in a given position with respect to the base member, a trip arm carrying a bait holder at the forward end thereof and positioned between said top and base members and pivotally connected adjacent the rear end thereof with said spring, and a catch element carried by the trip arm, the arrangement being such that said spring tends to elevate said bait holder and move said catch element into position for engaging the top member when said top member is disposed in a set position whereby the top member may be retained in the set position, said trip arm being operable for moving the catch element out of engagement with the top member whereby the spring may snap the top member to its first given position.

2. A trap comprising a base member, a top member positioned above the base member and swingably connected therewith, a spring connected with the base member and in engagement with the top member for yieldingly retaining the top member in a given position with respect to the base member, a trip arm positioned between the top and base members and movable with respect thereto, and a cam element pivotally connected with the spring and operatively associated with the trip arm, said cam element being provided with a catch portion and operable by the spring for moving the catch portion into engagement with the top member when said top member is disposed in a set position whereby the top member may be retained in the set position, said trip arm being operable for moving the catch portion out of engagement with the top member whereby the spring may snap the top member to its first given position.

3. A trap comprising a base member, a top member positioned above the base member and swingably connected therewith, a pair of spaced apart projecting elements connected with the base member, a spring extending around the projecting elements and cooperating with the top and base members for yieldingly retaining the top member in a given position with respect to the base member, a trip arm positioned between the top and base members and extending between the projecting elements, said trip arm having an end thereof pivotally connected with the spring and provided with a fulcrum portion positioned for engagement with the base member, and a catch element connected with the trip arm and operable by the spring for engaging the top member when said top member is disposed in a set position, said trip arm being operable for moving the catch element out of engagement with the top member whereby the spring may snap the top member to its first given position.

4. A trap comprising a base member and a top member, one of said members having a pair of integral spaced apart ears projecting toward the other member, said ears each having an opening therein and a horizontally projecting element, said other member having integral hooks receivable in said openings of said ears for pivotally securing said top member to said base, a spring having a pair of intermediate coils positioned on said projecting elements and arranged to move said top pivotally to capturing position, and a trigger mechanism carried by said base for releasably holding said top member in set position.

5. A trap comprising a base and a top, a pair of vertical ears extending upwardly from said base, each of said ears having an opening therethrough and a laterally extending spring retaining member, a pair of hooks integral with said top adapted to enter said openings for pivotally connecting said top and said base, a spring having two intermediate coils each positioned on one of said retaining members and arranged to move said top pivotally to capturing position, and a trigger mechanism carried by said base for releasably holding said top in set position.

6. A trap comprising a base, a top pivotally connected to said base, a spring carried by said base and being provided with an integral loop extending to adjacent the rear of said base and a pair of arms contacting with said top for moving the same pivotally to capturing position, a trigger arm pivotally supported by said spring loop and having a bait holder at its forward end, said trigger arm having a fulcrum on the lower side positioned forwardly of the pivotal axis of the trigger and adapted to engage said base whereby the forward end of the portion of said trigger arm positioned forwardly of said pivotal axis is elevated by said spring when said top is moved to set position, and a catch member carried by the rear portion of said trigger arm and arranged to engage a rear portion of said top for holding the same in set position.

SEBASTIAN P. NEUHAUSEN.